United States Patent [19]

Quang et al.

[11] Patent Number: 4,687,656
[45] Date of Patent: Aug. 18, 1987

[54] LONGITUDINAL REACTOR FOR CHEMICAL SYNTHESES IN GAS PHASE AND HETEROGENEOUS CATALYSTS

[75] Inventors: Dang V. Quang, Paris; Claude Pradel, Rueil Malmaison; Jean P. Euzen, Dardilly; Jean-Francois Le Page, Rueil Malmaison, all of France

[73] Assignee: Institut Francais du Petrole, Rueil-Malmaison, France

[21] Appl. No.: 496,375

[22] Filed: May 20, 1983

[30] Foreign Application Priority Data

May 21, 1982 [FR] France ................................ 82 08997

[51] Int. Cl.$^4$ .............................. B01J 8/04; C01C 1/04
[52] U.S. Cl. .................................. 423/361; 423/533; 422/148; 422/192; 422/194
[58] Field of Search ............... 422/191, 192, 194, 148, 422/190; 423/361, 210, 533–538

[56] References Cited

U.S. PATENT DOCUMENTS

| | | | |
|---|---|---|---|
| 1,196,481 | 8/1916 | Recklinghausen et al. | 422/24 |
| 1,200,940 | 10/1916 | Henri et al. | 422/24 |
| 1,266,803 | 5/1918 | Henri et al. | 422/24 |
| 2,887,365 | 5/1959 | De Rycker et al. | |
| 3,472,631 | 10/1969 | Schober | |
| 3,556,738 | 1/1971 | Schober | |
| 3,751,232 | 8/1973 | Borre et al. | 23/288 R |
| 3,898,049 | 8/1975 | Burroughs et al. | 23/288 R |
| 3,932,139 | 1/1976 | Vilceanu et al. | |
| 4,180,543 | 1/1979 | Ward | |
| 4,225,562 | 9/1980 | Anderson | 422/188 |
| 4,452,760 | 6/1984 | Peterson et al. | |

FOREIGN PATENT DOCUMENTS 1118750 7/1968 United Kingdom .
1140071 7/1969 United Kingdom .

Primary Examiner—Christopher W. Brody
Attorney, Agent, or Firm—Millen & White

[57] ABSTRACT

Process and apparatus for carrying out reactions in gas phase, wherein the gas is passed through a cylindrical catalytic reactor so designed that the catalyst bed is divided into several portions arranged in distinct vertical parallelepipedic compartments which are successively traversed by the reaction gas in a direction perpendicular to the axis of the cylindrical reactor. Fresh gas may be supplied between two compartments to maintain the temperature in a well controlled range.

17 Claims, 6 Drawing Figures

U.S. Patent    Aug. 18, 1987    4,687,656
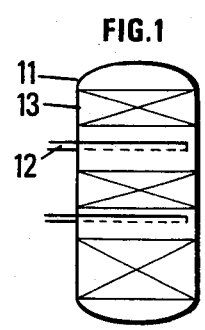
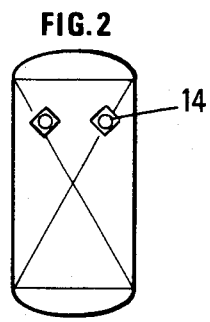
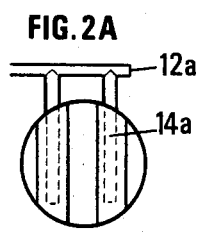
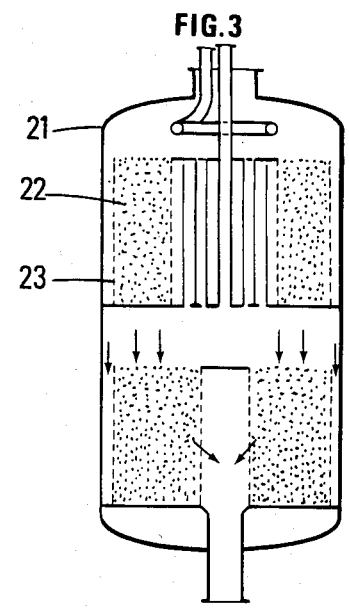
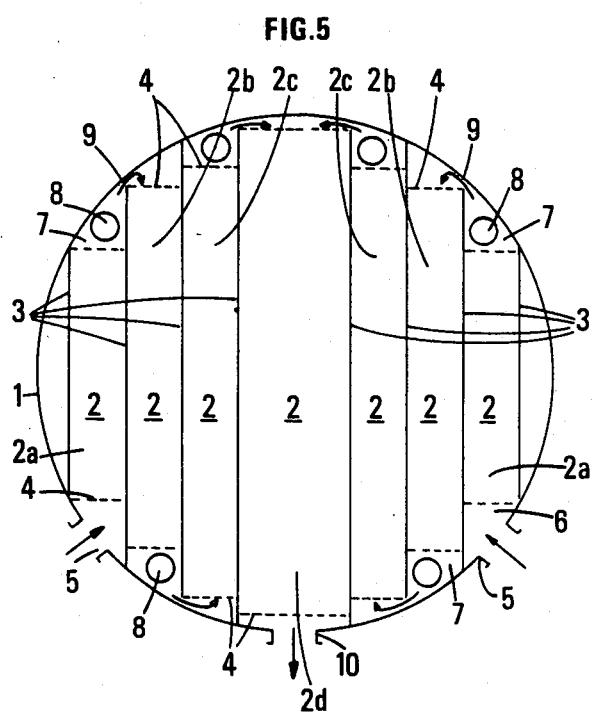
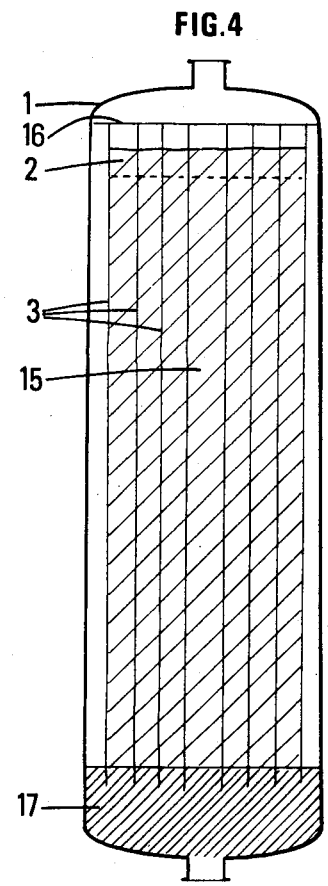

4,687,656

LONGITUDINAL REACTOR FOR CHEMICAL SYNTHESES IN GAS PHASE AND HETEROGENEOUS CATALYSTS

OBJECT OF THE INVENTION

This invention relates to a cylindrical reactor for chemical synthesis in gas phase and heterogeneous catalysis.

The reactor conceived according to the process of the invention is characterized in that the catalyst bed contained therein is divided into several vertical parallelepipedic compartments whose cross-sections are comprised in a circle coaxial with the circle defined by the circular section of the internal wall of the reactor.

The catalyst compartments are so arranged that the reaction gases circulate perpendicularly to the axis of the cylindrical reactor and pass successively from one compartment to the next.

Between two compartments, fresh gas can be added to maintain the reactor temperature within a narrowly controlled range.

The advantages of the reactor designed according to the process of the invention are multiple:

From a physico-chemical point of view, due to the adaptation of the passage cross-sections to the gas feed rate, the velocity and the distribution of the reactants are perfectly controlled throughout the whole catalyst volume.

The possibility of multiplying gas quenches allows a quasiisothermal run of the reactor and the permanent maintaining of the reaction rate to the maximum compatible with the stability of the catalyst.

From a technological point of view, as shown by the joint figures, the processes of the invention result in an easy conception and an exceptional constructional compactness.

Above all, the processes of the invention result in a one-piece reactor, irrespective of the desired production.

Finally, the processes of the invention allow a thorough standardized manufacture. For units of different sizes and capacities, the diameters and arrangements can remain the same, only the length of the reactor being adjusted in proportion to the desired production.

STATE OF THE ART

When effecting chemical syntheses in gas phase and by hererogeneous catalysis, it is well known to place the solid catalyst in a cylindrical container and to pass the reaction gas, at the appropriate temperature and pressure, through the so-formed catalyst bed.

The gas circulates in a direction parallel to the axis of the reactor, either upwardly or downwardly.

In industrial practice, due to the high circulation velocities, the latter solution is commonly used.

This preference can be explained by the fact that the gas, when circulating downwardly, tends to press the catalyst particles on the bottom of the reactor. Any risk of swelling of the bed or carrying away of the catalyst by the gas is thus avoided.

Rare are the chemical syntheses not involving thermal phenomena, either heat absorption or heat release.

The reaction gas (for example, synthesis gas for the manufacture of methanol and/or higher homologous alcohols), when contacted with the catalyst, tends either to chill or to warm excessively.

To maintain the gas in optimal temperature ranges, it is usual to arrange the catalyst as distinct catalyst beds (see FIG. 1).

To this effect, the reactor (11) is equipped with several supporting grids (12), the catalyst beds (13) being placed on these grids, only the ultimate bed being placed directly on the bottom of the reactor.

The void space between the supporting grid and the top of the bed placed just below is used to inject fresh gas and thus to bring back, by direct mixing, the temperature of the reaction gas to the optimized temperature range.

Since the carrier grids and the void spaces accompanying them represent a complication and result in an increase of the dead volume and of the price, it has recently been proposed to replace them with void spaces arranged as sheets within the catalyst bed itself (FIG. 2 and cross-section 2A).

These void spaces (14 or 14a) are defined by tubes preferably of lozenge cross-section inside of which are placed injectors for fresh gas (12a, FIG. 2a). The walls of the tubes comprise either perforations or grids in order that the gas passing through the catalyst bed be preferentially sucked therein (British Patent No. 1 105 614).

Since giant units are more and more required nawadays, the evolution of the axial reactors is quickly stopped by excessive diameters.

It is why reactors of the radial type have gained success.

In this type of reactor (FIG. 3), the catalyst (22) is enclosed, whithin reactor (21), in a cylindrical crown (23), coaxial to the reactor. The gas, instead of circulating vertically through the reactor section, circulates horizontally through the catalyst crown.

Considering a reactor of 2 m diameter and 10 m height, a simple determination shows that the cross-sectional passage for the gas can be multiplied by 20, passing from about 3 sq.m to more than about 60 sq.m.

The disadvantages of the radial reactor are numerous.

The first disadvantage of the radial reactor lies in the poor distribution of the gas through the catalyst bed.

As a matter of fact, whereas, in the axial reactors, the velocity of the gas tends to be too high, due to the small cross-sectional passage, conversly, in the radial reactors, the velocity of the gas tends to be too low, due to a too large cross-sectional passage.

Since a low velocity favors preferential paths, it has been proposed to prevent this either by making use of a double wall with restriction orifices to increase the pressure drop (British Patent No. 1 118 750) or by dividing the catalyst crown into several sectors, the gas being forced to pass alternatively from a sector to another one (British Patent No. 1 140 071).

These improvements avoid the poor distribution of the gas through the bed; but they leave unsolved the true problem of a good contact and a good exchange between the gas and the solid catalyst. This problem can only be solved by an efficient control of the gas velocity within the catalyst bed itself.

The second disadvantage of the radial reactor lies in a loss of useful space. Since it is generally an enclosure maintained under high pressure whose weight attains several hundreds of tons, it is clearly a major disadvantage.

It is why various arrangements have been proposed to usefully utilize the dead space corresponding particularly to the empty central nucleus of the reactor.

In many cases, this concerns tubular exchangers of either the charge-effluent type or of the inter-catalyst beds type (U.S. Pat. No. 4,230,669 and British Patent No. 1 140 071).

The third disadvantage of the radial reactors lies in the difficulty to effect intermediate coolings between the distinct catalyst beds.

The U.S. Pat. Nos. 3,751,232 and 4,230,669 have proposed several solutions. The latter are either relatively complicated or pose quasi-insoluble problems when charging and discharging the catalyst.

THE INVENTION

The present invention concerns a process for effecting chemical syntheses in gas phase in a reaction zone (1) (see FIG. 5) of cylindrical shape and in the presence of a solid catalyst; the process of the invention is characterized in that the reaction zone is divided into several enclosures (2) containing the catalyst, these enclosures being of elongate and parallelepipedic shape and adjacent to one another, the cross-sections of these enclosures being substantially comprised within a circle coaxial to the circle defined by the circular section of the reaction zone, the adjacent axial side walls (3) of these enclosures or the common axial side walls of the adjacent enclosures being tight to the gas encirculated in the reaction zone, the axial end walls (4) of these enclosures having substantially smaller cross-section than the side walls and being permeable to the gas, the gas supplied to the reaction zone thus circulating progressively through each of the enclosures, substantially perpendicularly to the axis of the reaction zone and defining an essentially sinuous path, the gas being fed to each enclosure through a permeable end wall and discharged through a permeable end wall opposite to the wall through which the gas has been fed.

More particularly, the invention relates, by way of non-limitative example, to a process wherein fresh gas or a gas charge are fed to the reaction zone (1) through two ducts (5) in the vicinity of each of the two first enclosures (2a) which are the most remote from each other, thus the most remote from the axis of the reaction zone, these two first enclosures being diametrically opposite to each other, the gas or the charge are then fed to each of these two enclosures through one of the two permeable end walls of each of these two enclosures, the gas or the charge progressing thereafter within the two first enclosures (2a) in the direction of the second permeable end wall of each of these two first enclosures, the gas leaving each of these two first enclosures through this so-called permeable end second wall and being fed to another enclosure (2b) adjacent to the first enclosure (2a) through one of the two permeable end walls of this other enclosure these permeable walls being in the immediate vicinity of the permeable walls through which said gas was discharged from said first enclosures, the gas thus progressing, as two distinct streams, through at least one enclosure (2b) and another enclosure (2c), being fed to each enclosure through one of its two permeable end walls and discharged through the other permeable end wall, thus reaching the one or more central elongate enclosures (2d), i.e. those arranged approximately along one of the reactor diameters.

The invention also concerns the apparatus comprising a reactor (1) (see FIG. 5) of cylindrical shape and circular cross-section, characterized in that it comprises several elongate parallelepipedic compartments (2) adjacent to each other and whose cross-sections are comprised within a circle coaxial to the circle defined by the circular section of the internal wall of the reactor, the adjacent side walls (3) of the adjacent compartments being tight to gas whereas the side end walls (4) of said compartments are permeable to gas.

The invention also concerns the apparatus which also comprises:

means (5) for supplying a gas phase in the vicinity (6) of each of the two compartments the most remote from the vertical axis of the reactor, these two compartments being diametrally opposite to each other, spaces (7) for circulating the gas from a compartment to another compartment, these spaces being in the vicinity of most of said permeable end walls, between said permeable end walls and the internal wall of the reactor, slots such as (9) arranged between the internal wall of the reactor (1) and most of the tight side walls (3) to ensure the passage of gas from a space (7) into a compartment.

BRIEF DESCRIPTION OF THE DRAWINGS

FIG. 1 is a side view of a first type of prior art reactor with distinct catalyst beds therein:

FIG. 2 is a side view of a second type of prior art reactor with void spaces disposed between the sheets.

FIGS. 2A is a cross section through FIG. 2.

FIG. 3 is a side view of a third type of prior art reactor illustrating a radial configuration in which gas circulates horizontally through the catalyst.

FIG. 4 is a side view of a reactor in accordance with the invention in which the reaction is divided into several compartments containing a catalyst.

FIG. 5 is an enlarged cross section through the reactor of FIG. 4.

DETAILED DESCRIPTION OF THE INVENTION (FIG. 4 and 5)

The cylindrical reactor for chemical synthesis (1) is divided into several parallelepipedic compartments containing a catalyst (15) as shown in FIG. 4.

These compartments are defined by tight side walls (3) and permeable end walls (4), the latter being only shown in the cross-section of FIG. 5 to which it will be referred in the following description. The permeable end walls (4) can consist either of wires in parallel or crossed arrangement, or of perforated or alveolate plates, or of any other equivalent type. Accordingly such end walls are permeable substantially throughout the entire area thereof.

The compartments (2) are filled with a solid catalyst, for example a catalyst for the synthesis of methanol and/or homologous alcohols from a gas containing hydrogen, carbon monoxide and optionally carbon dioxide.

The fresh gas (5), for example a mixture of hydrogen with nitrogen or a mixture of hydrogen with carbon oxides, at the selected pressure and temperature, is introduced into the void spaces (6) between the cylindrical wall of the reactor and the walls (3 and 4) of the catalyst compartments.

From the spaces (6), the gas is passed through the permeable walls (4) to be contacted with the catalyst.

The section of the compartments (2a) is so selected as to obtain a sufficient velocity of the gas through the catalyst mass. It is known that this velocity of the gas depends on the homogeneity of the gas distribution and the absence of hot point at the surface of the catalyst particles.

According to the processes of the invention, the gas velocity must be preferably comprised between 1 and 200 meters per second, preferably between 5 and 100 meters per second.

The above gas velocities are based on the gas feed rate by volume, in normal conditions of pressure and temperature, i.e. at the atmospheric pressure and at 0° C.

In section (2a), due to the effect of the reactions between these gases, the latter tend either to be heated or colled.

The volume of catalyst in the compartment (2a), as well as the volume in the other compartments, is so selected as to maintain the temperature within an optimum range, i.e. a temperature difference between the output and the input (endothermic reactions) or between the input and the output (exothermic reactions) of a compartment comprised, for example, between 1 and 100 degrees C., preferably between 2 and 50 degrees C.

At the output of the compartments (2a), the gases are supplied to the void space (7) corresponding to the void space (6) of the input.

In this space, the gases are generally admixed with fresh gas supplied through the distribution duct (8).

This quench brings the gases to the input temperature of the reactor.

From a space such as (7), the gases pass through a passage way such as (9) between the flat side walls (3) and the reactor wall (1) to reach the compartments (2b) and so on.

It can be seen in FIG. 5 that the gas is distributed symmetrically with respect to the diameter of the reactor. It is clear that a continuous circulation from one end to the other end of the reactor is also within the scope of the invention.

A longitudinal cross-section of the reactor is shown in FIG. 4. The reactor is shown in vertical position.

In same cases, an horizontal position may have same advantages. It is, for example, the case when the reactor is very long since there is an appreciable difference of static pressure between the top and the bottom of the reactor.

In the radial reactors, this pressure difference is responsible for a poor distribution of the gas that several inventions have tried to obviate (U.S. Pat. No. 3,754,078, British patent No. 1 118 750).

In the case of the invention, due to a good control of the circulation velocity, this problem is not so important. However the horizontal arrangement may have advantages in the case of extremely large reactors.

In FIG. 5, the cylindrical wall of the reactor is simple and made in one single piece.

In the case of, for example, the ammonia synthesis, the wall of the reactor can be lined or its resistance can be increased by any adapted device in order that the resistance of the wall be not altered by an excessive temperature.

Between the two walls, relatively cool fresh gas is circulated before admission into the reactor.

This fresh feed gas is then pre-heated by effluent gas withdrawn from any of the compartments before being supplied to one of the catalyst beds. The preheater, in that case, is arranged, for example, at one end of the reactor and is thus takes part to the processes of the invention. When the catalyst operates under severe conditions of pressure and temperature, the problems of feeding and discharging the catalyst are very important.

The parallelepipedic chambers (2) are closed at their upper and lower ends, in order that the gas cannot pass from a chamber to another chamber through these ends. This can be achieved by arranging a tight plate such as (16) at each axial end of said chambers (only one of these plates has been shown in FIG. 4).

One of the advantages of the processes of the invention is to allow the supply and the discharge of the catalyst without disassembling the reactor and its internal parts.

The discharge of the catalyst is particularly easy according to the modification shown in FIG. 4.

According to this modification, the bottom of the parallelepipedic compartments, instead of being flat bottom, is formed of a layer (17) of solid particles filling the generally elliptical bottom of the reactor: these particles are characterized in that their average diameter in that layer is comprised between one half and one thousandth of the average diameter of the catalyst particles constituting the catalyst bed, and preferably between one fifth and one hundredth of this average diameter.

These solid particles can consist at least partly of powdered catalyst, metals, inert materials such as alumina or carborundum or any other equivalent solid material.

In the present process, the gas charge can be supplied from the top, from the bottom or from any point of the reactor wall, the essential being that it be distributed vertically along the permeable inputs of the catalytic enclosures.

What is claimed is:

1. A process for carrying out gaseous chemical reactions in a reaction zone (1) (FIG. 5) defined by an enclosure of substantially cylindrical shape and of substantially circular cross-section, the process being effected in the presence of a solid catalyst, the process being characterized in configuring the reaction zone into a plurality of enclosures (2), said enclosures containing a catalyst and being elongate in the axial direction and of parallelepipedic shape in radial cross-section and being adjacent to one another, the cross-sections of said enclosures being substantially contained within a circle coaxial to the circle defined by the circular section of the reaction zone, such that the enclosures vary in depth according to the corresponding subtense of the coaxial circle, the adjacent axial side walls (3) of these enclosures or the common axial side walls of the adjacent enclosures being tight to the gases circulated in the reaction zone, the axial end walls (4) of these enclosures being permeable to the gases throughout the entire area thereof, introducing the gases into the reaction zone and circulating the gases successively through each of the enclosures in a direction substantially perpendicular to the axes of the reaction zones by supplying the gases to each enclosure through one of said permeable end walls and discharging the gases therefrom through a permeable end wall opposite to the wall through which the gases have been supplied.

2. A process according to claim 1, wherein fresh gas or a gas charge are fed to the reaction zone (1) through two ducts (5) in the vicinity of each of the first two enclosures (2a) the most remote from each other, thus the most remote from the axis of the reaction zone, these first two enclosures being diametrally opposed to each other, the gas or the charge being then fed to each of these two enclosures through one of the two permeable axial end walls of each of these two enclosures, the gas or the charge passing then inside the first two enclosures (2a) in the direction of the second permeable end wall of each of these first two enclosures, the gas leaving each of these first two enclosures through said second permeable end wall and passing into another enclosure (2b) adjacent to one of the first two enclosures (2a) through one of the two permeable end walls of this other enclosure, these permeable end walls being those in the immediate vicinity of the permeable end walls through which the gas has been discharged from said first enclosures, the gas thus passing successively, as two distinct streams, through at least one enclosure (2b) and another enclosure (2c), being supplied to each enclosure through one of its two permeable end walls and discharged through the other permeable end wall, thus joining the central elongate enclosure(s) (2d), i.e., those arranged substantially along one of the diameters of the circular section of the reaction zone, wherefrom they are then discharged as reaction effluent.

3. A process according to claim 1, wherein the velocity inside said enclosures is selected between about 1 and 200 meters/sec.

4. A process according to claim 3, wherein said velocity is selected between about 5 and 100 m/sec.

5. A process according to claim 1, wherein the reaction zone is arranged substantially vertically.

6. A process according to claim 1, wherein, in addition, relatively cold gases are introduced through a duct such as (8) to cool the gases discharged from at least one said enclosure, such as (2a), and before their supply to a next enclosure, such as (3a).

7. A process according to claim 1, wherein the catalytic volume of each enclosure is so selected that the temperature difference, in said enclosure, between the input and the output or between the output and the input be comprised between about 1° and 100° C.

8. A process according to claim 7, wherein the temperature difference is selected between 2° and 50° C.

9. A process according to claim 1, wherein, at the output of at least one enclosure, a portion of the gas effluent is discharged, either to recycle it to any other enclosure or to preheat at least part of the gases fed to the reaction zone.

10. A process according to claim 1, wherein the lower portion of the reaction zone, into which penetrate at least partly said enclosures, is filled with a layer of solid particles whose average diameter is selected between one half and one thousandth of the average diameter of the catalyst particles.

11. A process according to claim 10, wherein the average diameter of said particles is selected between one fifth and one hundredth of the average diameter of the catalyst particles.

12. A process according to claim 10, wherein said particles consist at least partly of powdered catalyst, metals or inert materials.

13. A process for performing chemical reactions in a gas while the gas traverses a reaction zone containing a catalyst, the process being performed within a cylindrical container having a vertical axis, the process comprising the steps of:

retaining the catalyst in a plurality of vertically extending enclosures having gas impermeable walls extending in a first plane subtending the cylindrical container, and having gas permeable, first and second end walls extending between the impermeable walls over substantially the full height thereof; the enclosures being arranged side-by-side within the cylindrical container progressing from outboard locations to a central inboard location, the end walls of the enclosures being alternately connected;

flowing the gas sequentially through the enclosures at the outboard location to the enclosures at the inboard location over a pair of horizontally extending, linear sinuous paths by introducing the gas through the first end walls of the two outer-most enclosures and extracting the gas from one end of the central inboard enclosure, the gas being distributed over substantially the entire enclosure height as the gas traverses the sinuous paths.

14. The process of claim 13, further including the step of introducing a second gas into the paths of the first gas while the first gas traverses the paths.

15. An apparatus comprising a reactor (FIG. 5) of substantially cylindrical shape and whose crosssection has a circular shape, characterized in that it comprises a plurality of elongate parallelepipedic compartments (2), said compartments containing a catalyst and being adjacent to one another and having cross-sections contained within a circle coaxial to the circle defined by the circular section of the internal wall of the reactor, such that the compartments vary in width according to the corresponding subtense of the coaxial circle, the adjacent axial side walls of the compartments of the common axial side walls of the adjacent compartments being gas-tight walls (3) and the axial end walls (4) of said compartments being permeable to gas substantially through the entire area thereof.

16. An apparatus according to claim 15 also comprising:

means (5) for supplying a gas phase in the vicinity (6) of each of the two compartments the most remote from the vertical axis of the reactor, these two compartments being diametrically opposed to each other, spaces (7) for circulating gas from one compartment to another compartment, these spaces being provided in the vicinity of most of said permeable end walls, between said permeable walls and the internal wall of the reactor, slots such as (9) between the internal wall of the reactor (1) and most of the tight side walls (3), to ensure the passage of gas from a space (7) to a compartment.

17. An apparatus according to claim 15, also comprising means (8) for introducing gas, this means being arranged at the internal periphery of the reactor in the spaces (7) provided between the internal wall of the reactor (1) and at least one of said permeable end walls (4) of a compartment.

* * * * *